United States Patent [19]

Olsen et al.

[11] Patent Number: 4,635,350
[45] Date of Patent: Jan. 13, 1987

[54] METHOD OR MANUFACTURING ARMATURE WINDING FOR A LARGE TURBINE GENERATOR

[75] Inventors: Dwight Olsen, Concord, Calif.; Robert L. Wall, Delanson, N.Y.

[73] Assignee: General Electric Company, Schenectady, N.Y.

[21] Appl. No.: 789,183

[22] Filed: Oct. 18, 1985

[51] Int. Cl.⁴ ............................................. H02K 15/06
[52] U.S. Cl. ........................................ 29/598; 29/606; 310/180; 310/201; 310/208
[58] Field of Search ........................... 29/598, 596, 606; 310/180, 198, 201, 206, 208, 202

[56] References Cited

U.S. PATENT DOCUMENTS 3,760,493  9/1973  Snively ................................. 29/596

Primary Examiner—Carl E. Hall
Attorney, Agent, or Firm—Robert A. Cahill

[57] ABSTRACT

A multi-layer armature winding for large turbine generator is wound with individual diamond coils around to the point where the sides of initially wound diamond coils lying in upper armature slot positions interfer with the placement in lower slot positions of the coil side of additional diamond coils to complete the winding. To avoid having to "raise the jump" the winding is completed using bar coils, individual bars of which having been laid in those lower slot positions prior to the placement of any diamond coils. The remaining bars are laid in the vacant upper slot positions and then electrically joined with the initially laid bars to complete the individual bar coils.

4 Claims, 5 Drawing Figures

METHOD OR MANUFACTURING ARMATURE WINDING FOR A LARGE TURBINE GENERATOR

BACKGROUND OF THE INVENTION

The present invention relates to dynamoelectric machines and particularly to armature windings for large turbine generators.

A conventional turbine-driven generator comprises a stationary core or armature and a cooperating rotatable field element or rotor. The armature is formed of laminations of magnetic material and is provided with an elongated cylindrical opening or bore bounded by a plurality of angularly spaced winding slots in which an armature winding is accommodated. The rotor is journalled for rotation within the armature bore and carries a plurality of pole pieces arrayed about its periphery. Turbine generators capable of generating electrical power in the high MVA range are massive in size, for example the rotors alone may weigh 300 tons or more and be in excess of 25 feet in diameter.

In generators of this size, the armature windings necessarily have a considerable conductor cross section typically made up of a plurality of individually insulated aluminum or copper strips or strands bound together in a ground insulation jacket. Armature windings are typically of two basic types. In a bar coil armature winding, each winding coil comprises two essentially straight conductors segments or "bars" which are laid in different armature core slots and the appropriate end turn connections or joints therebetween are subsequently made by appropriate means such as welding, brazing or separate electrical connector elements. This winding approach is advantageous in the case of multi-layer armature windings where two or more bars of different coils must be laid in each of the winding slots in stacked relation. This is so since the two bars of each coil typically occupy different radial positions in their respective winding slots. By effecting the appropriate end turn connections after all the bars have been positioned in the winding slots, there is no need to temporarily remove one bar from its upper slot position to lay another bar in a lower slot position of the same winding slot. An additional advantage of the bar coil winding approach is that repair or replacement of damaged coils is facilitated. Fewer coils need to be removed to access damaged coils and less disassembly of the generator is required to effect repair or replacement. The major disadvantage of the bar coil winding approach is that the winding process is very time consuming and expensive.

As a more economical approach, turbine generator manufacturers have resorted to utilizing form coil armature windings, wherein the insulated winding conductor strands are machine wound into so-called "diamond" coils comprising two straight coil sides and integrally interconnecting end turn sections. Each diamond coil is then provided with a ground insulation jacket that binds the conductor strands together to create a rather rigid structure which in the case of large turbine generators can weigh in excess of one hundred pounds. These diamond coils are then used to wind the armature by progressively laying their straight coil sides in the armature winding slots. Since for a multi-layer winding, the two sides of each coil typically occupy radially different positions in their respective slots, it becomes necessary toward the end of the winding processes to perform the step known as "fanning" or "raising the jump". This step involves lifting one side of previously placed diamond coils temporarily out of their slots in order to lay the sides of later-placed diamond coils therebeneath in lower slot positions. Since the other sides of the lifted or fanned coils are lodged in lower positions in their respective slots, the coils must be forcibly deformed to elevate their one sides out of the slots. This deformation, sometimes facilitated by heating the coils, if not carefully performed, can damage the coil insulation. While diamond coil wound armature windings are more economical to wind in the first instance, they are not so when it becomes necessary to repair or replace damaged coils. As noted above in connection with bar coil armature windings, a significant number of diamond coils must be removed and considerable generator disassembly is required to gain access to damaged coils. Typically, to access damaged coils, the turbine rotor has to be removed using heavy rigging equipment. This is particularly so if the armature has to be completely rewound, which for large turbine generators must be done in the field. Some generating sites are not equipped with adequate rigging equipment to pull the turbine rotor and may be in remote locations where such heavy equipment can not be readily brought in.

It is accordingly an object of the present invention to provide an improved armature winding for large turbine generators.

A further object is to provide an armature winding of the above-character which is more convenient to wind.

Another object is to provide an armature winding of the above-character which can be applied to turbine generators in the field in an expeditious and economical manner.

An additional object of the present invention is to provide an improved method for winding the armature of a large turbine generator.

Yet another object is to provide an improved method for rewinding the armature of a turbine generator in the field.

Other objects of the invention will in part be obvious and in part appear hereinafter.

SUMMARY OF THE INVENTION

In accordance with the present invention, there is provided a multi-layer armature winding for a large turbine generator which is wound in compound fashion to include a bar coil winding segment and a diamond coil winding segment. That is, the armature is wound with diamond coils to the point where the step of "raising the jump" would have to be performed to complete a diamond coil winding in accordance with conventional practice. However in accordance with the present invention, the armature winding is completed with bar coils, thus eliminating the need to perform the "raising the jump" step. The resulting compound armature winding possesses some of the advantages of both bar wound and diamond coil wound windings. A most significant advantage of applicants' compound armature winding is obtained when rewinding armatures of large turbine generators in the field by virtue of the fact that the rewinding process can in most instances be performed with the rotor in place.

For a full understanding of the nature and objects of the present invention, reference may be had to the following detailed description taken in connection with the accompanying drawings, in which.

Like reference numerals refer to like parts throughout the several views of the drawings.

DETAILED DESCRIPTION

Figure 1:
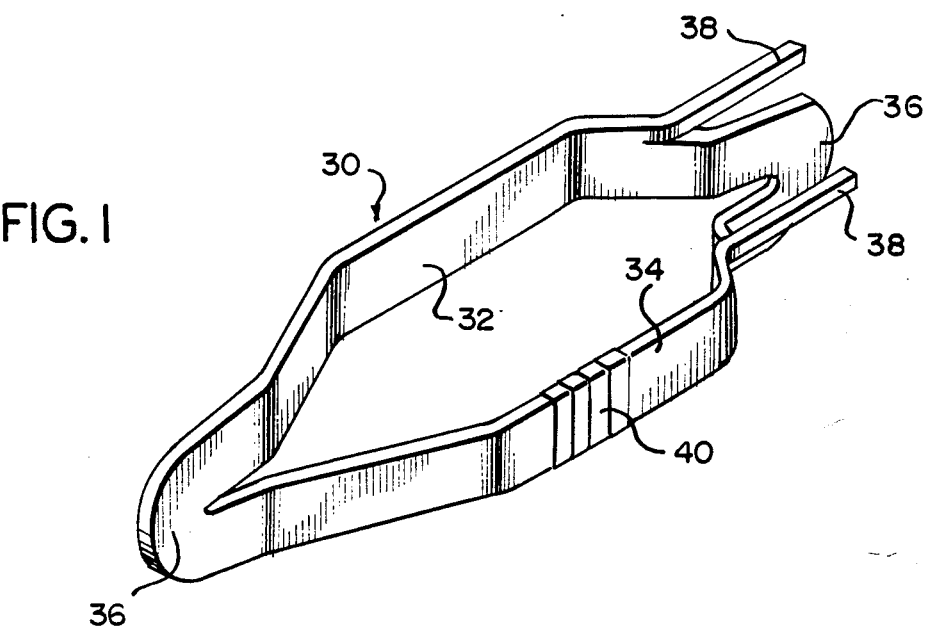
FIG. 1 is a perspective view of a diamond coil utilized in the turbine generator armature winding of the present invention.

Referring to FIG. 1, a diamond coil, generally indicated at 30, is constructed by machine winding a plurality of turns of individually insulated conductive strips or strands into a coil shape which is subsequently pulled into the diamond configuration shown. Each diamond coil includes a pair of elongated straight sides 32 and 34 integrally interconnected by end turn sections 36. Coil terminations 38 are brought out for later coil interconnections after it has been wound onto the armature of a large turbine generator (not shown). As is common practice, the diamond coils are created with suitable strand transpositions, such as inverted turn transpositions, to cancel unbalanced voltages at coil terminations 38. Coil 30 is provided with a ground insulation jacket 40, which may be in the form of an overlapped fabric tape wrapping or by encapsulation in a molded resinous material. As can be seen in FIG. 1, when pulling coil 30 into its diamond shape, its sides 32 and 34 are disposed in offset relation such that, upon installation, the former side can assume an upper position in one armature winding slot and the latter a lower position in another winding slot. The distance between coil sides is termed the coil "pitch" or "span" and is typically expressed in terms of the number of winding slots between the coil sides upon insertion into their appropriate armature slots.

Figure 3:
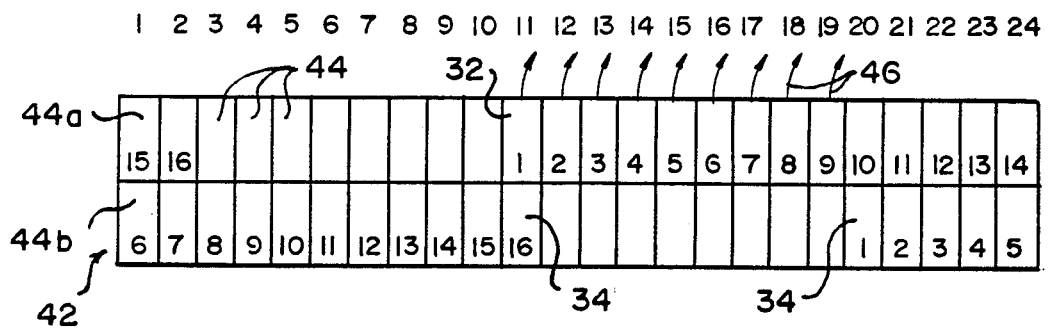
FIG. 3 is a schematic developed surface representation of a turbine, armature partially wound with diamond coils in accordance with typical prior art practice.

The problems encountered in winding a turbine armature with diamond coils such as coil 30 can be best understood with reference to FIG. 3 which schematically represents an armature, generally indicated at 42, having twenty four winding slots 44 numbered 1 through 24. Each winding slot has two coil side positions, an upper slot position 44a and a lower slot position 44b. It will be appreciated that, in the actual armature, the slots are separated by teeth and open into the armature bore in confronting relation with the generator rotor (not shown) with slot No. 24 adjacent slot No. 1. The diamond coils are numbered on the basis of the order or sequence in which their coil sides are inserted in the armature winding slots. Thus, as seen in FIG. 3, coil side 32 of coil No. 1 is inserted into the upper slot position 44a of slot No. 11, while its coil side 34 is inserted into the lower slot position of slot No. 20. Thus, in this illustration, the coil pitch or span (coil side separation) is nine winding slots. The corresponding insertions of the coil sides of coils Nos. 2 through 15 progressing rightwardly in FIG. 3 can proceed without problem. However, when it comes to the placement of diamond coil No. 16, it is seen that its coil side 34 can not be inserted into the lower slot position 44b of slot No. 11, since the upper slot position 44a of this slot is already occupied by coil side 32 of coil No. 1. The same problem pertains for coil sides 34 of coils Nos. 17 through 24, because of the occupation of coil sides 32 of coils Nos. 2 through 9 in the upper slot positions of slots Nos. 12 through 19. Consequently, the interfering coil sides of coils Nos. 1 through 9 must be lifted out of their upper slot positions so that the coil sides 34 of coils Nos. 16 through 24 can be inserted into their appropriate lower slot positions in slots Nos. 11 through 19. This lifting procedure, indicated by arrows 46, is referred to in the art as "fanning" or "raising the jump", as noted above. The possible deleterious effects on the coil insulation encountered in "raising the jump" have been recounted above, and they become more pronounced as the coil pitch increases. Moreover, "raising the jump" takes up considerable space, which is not available when rewinding a turbine armature in the field unless the rotor is pulled. Removing a turbine rotor weighing hundreds of tons requires heavy rigging equipment which may not be readily available at remote generating sites.

Figure 2:
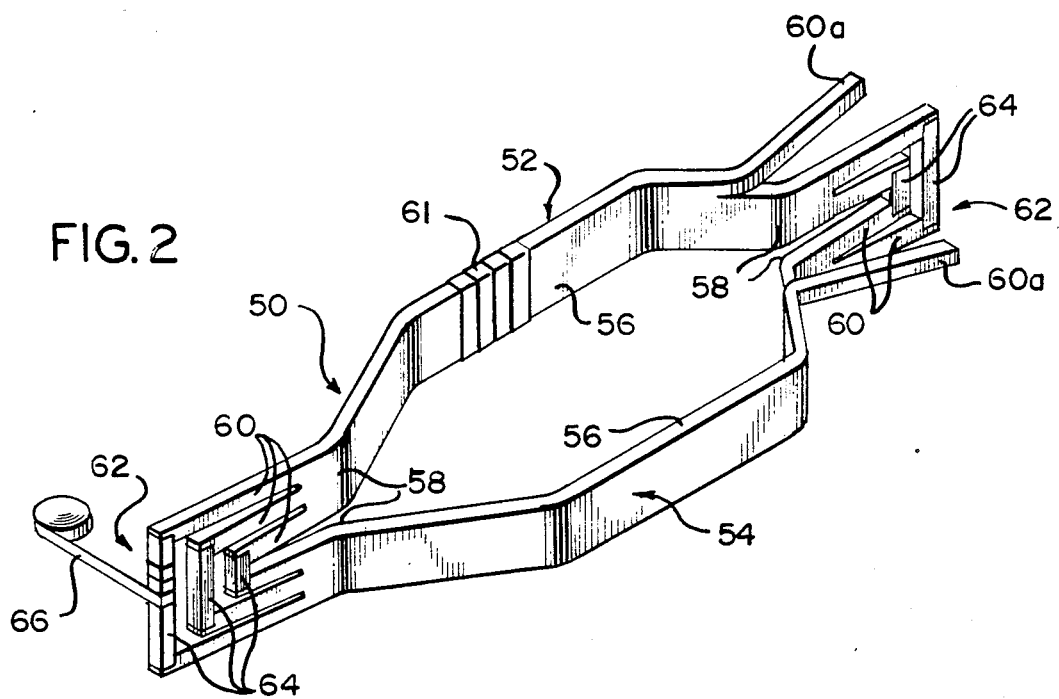
FIG. 2 is a perspective view of a bar coil utilized in the turbine generator armature winding of the present invention.

To avoid all of these problems associated with "raising the jump" and in fact to eliminate the need for this procedure, the present invention utilizes diamond coils 30 to wind the armature around to the point where the step of "raising the jump" would have to be performed and then completing the winding process utilizing bar coils, one of which is indicated generally at 50 in FIG. 2. Each of these bar coils includes a pair of bars, generally indicated at 52 and 54, each in turn comprising an elongated, straight slot section 56 terminated at each end in partial end turn sections 58. The multiplicity of conductive strands within each bar are individually insulated and, in the illustrated embodiment, arranged in three groups or partial turns 60. Except for the partial turn terminations at the end turn segments 58, the bars 52 and 54 are provided with an outer ground insulation sheath or jacket 61. To avoid circulating current problems, the strands of each partial turn 60 are transposed to uniformly vary their positions within its bar along the length of its slot section 56. A widely used transposition technique is the "Roebel" transposition wherein the strands of each partial turn rotate positions through 360 degrees such as to occupy every possible strand position along the length of the bar section which is to occupy an armature slot, i.e., slot section 56. For a more detailed discussion of "Roebel" transpositions, reference may be had to U.S. Pat. No. 1,144,252. As a consequence of utilizing a "Roebel" transposition, the induced voltages of each strand of a partial turn 60 are balanced, such that there is no potential difference between these strands at their termination in end turn sections 58. Consequently, the strand terminations of appropriate partial turns at each bar end turn section may be commonly electrically interconnected by suitable electrical joints, collectively indicated at 62, which may take the form of straps 64 welded or brazed to their butt ends. These separate electrical joints complete the bar coil turns, three in the illustrated embodiment, leaving partial turn terminations 60a as the coil terminations for ultimate connections with other coil terminations to complete the armature winding. The joints are individually insulated with a wrapping of tape 66 and collectively insulated with a tape wrapping or encapsulated in a molded resinous material (not shown) to provide the requisite ground insulation.

Figure 4:
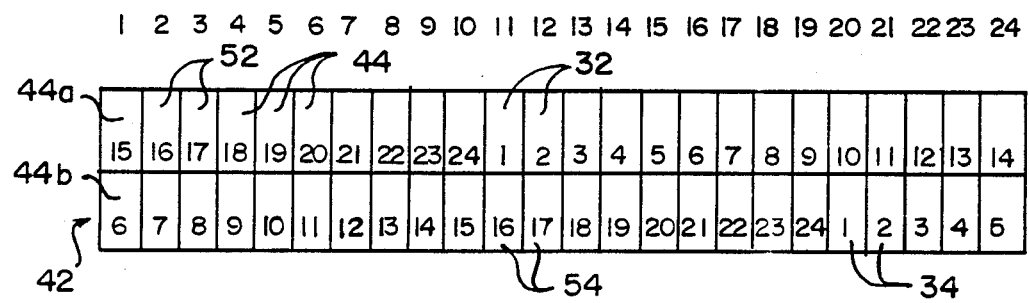
FIG. 4 is a schematic developed surface representation of a turbine armature wound with a compound winding of the present invention including diamond coils and bar coil winding segments.
Figure 5:
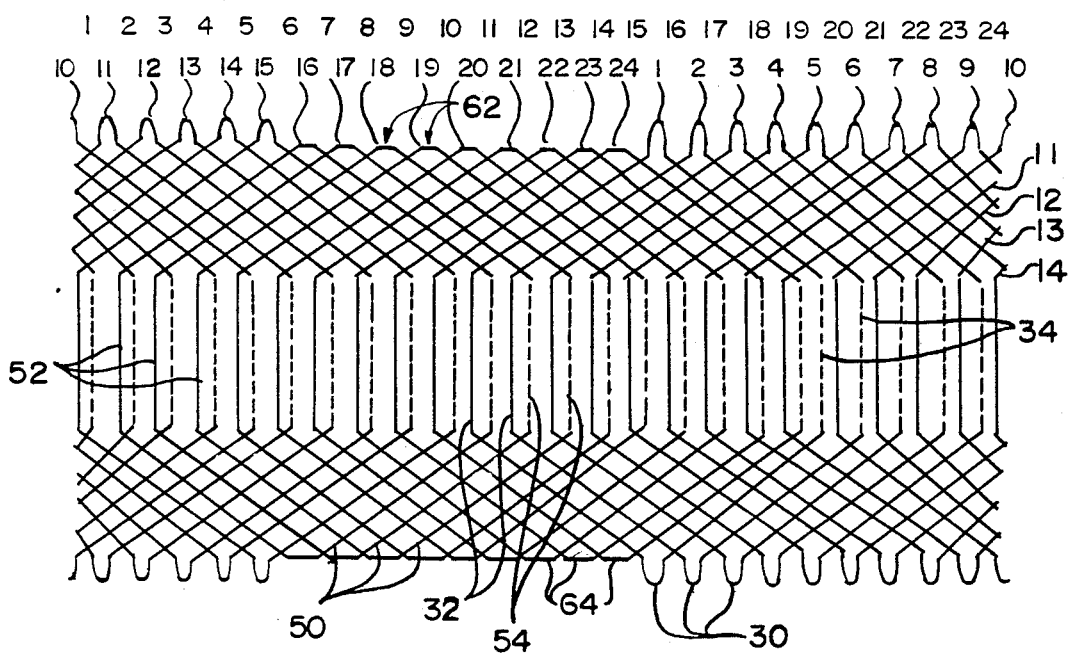
FIG. 5 is a schematic winding diagram of a compound turbine armature winding constructed in accordance with the present invention.

Turning to FIGS. 4 and 5, applicants' novel armature winding and the method of constructing same will be described in detail. Prior to the installation of diamond coils Nos. 1 through 9 in their appropriate winding slots pursuant to the winding procedure described in connection with FIG. 3, a bar 54, seen in FIG. 2 and indicated in dash-line in FIG. 5, is inserted into the lower slot position 44b of each of the armature slots Nos. 11 through 19. This having been done, diamond coils Nos. 1 through 15 are successively inserted in their appropriate slots with their coil sides 32 and 34 (FIG. 1) disposed in upper and lower slot positions, respectively. Coil sides 34 are indicated in dash line in FIG. 5. At this point the only remaining unoccupied slot positions are the upper slot positions 44a of slots Nos. 2 through 10. Thus to continue the winding process, bars 52 are inserted in these only remaining slot positions. It now remains to effect the separate electrical joints 62 between the partial turn terminations 60 of the bars 52 disposed in the upper slot positions of slots Nos. 2 through 10 with the proper ones of the partial turn terminations of appropriate ones of the bars 54 disposed in the lower slot positions of slots Nos. 11 through 19. With these joints 62 seen in FIGS. 2 and 5, coils Nos. 16 through 24 are perfected as bar coils 50.

It is thus seen that by winding armature 42 with the combination of diamond coils and bar coils in the above-described manner and as best illustrated in FIG. 5, there is no need for "raising the jump" as would be the case if only diamond coils are used in the armature winding.

It will thus be seen that the objects set forth above, among those made apparent in the preceding description are efficiently attained, and, since certain changes may be made in the armature winding and method of constructing same as set forth without departing from the scope of the invention, it is intended that all matter contained in the above description and shown in the accompanying drawings shall be interpreted as illustrative and not in a limiting sense.

Having described the invention, what is claimed as new and desired to secure by Letters Patent is:

1. A method of winding a magnetizable member of a dynamoelectric machine wherein the member has a cylindrical surface and a plurality of axially extending slots uniformly spaced therein and opening into the cylindrical surface thereof, each slot having upper and lower slot positions, said method including the steps of:
   A. successively placing a plurality of multiturn diamond coils on the member with first sides thereof inserted in respective upper slot positions of successive slots and second sides thereof inserted in respective lower slot positions of successive different slots;
   B. halting the successive placement of the diamond coils at the point where the first coil sides of initially placed diamond coils in the upper slot positions of a first succession of slots interferes with the insertion into the lower slot positions thereof of the second coil sides of additional diamond coils required to complete the winding process;
   C. respectively inserting first conductive bars into the lower slot positions of each of the first succession of slots;
   D. respectively inserting second bars into the upper slot positions of a second succession of slots left vacant at the point at which the placement of diamond coils is halted; and
   E. electrically joining the terminations of the first bars with the terminations of the second bars to create separate multiturn bar coils and thereby complete the winding process without disturbing the positions of any initially placed diamond coils.

2. The method defined in claim 1, wherein said step of inserting first conductive bars into the lower slot positions of the first succession of slots is performed prior to the placement of any diamond coils on the member.

3. The method defined in claim 2, wherein said electrical joining step comprises welding separate conductive straps to the terminations of the first and second bars.

4. The method defined in claim 2, which further includes the step of separately insulating the conductive straps.

* * * * *